US006458192B1

(12) United States Patent
Tsujio

(10) Patent No.: US 6,458,192 B1
(45) Date of Patent: Oct. 1, 2002

(54) ERASABLE INK COMPOSITION

(75) Inventor: Shinji Tsujio, Sakai (JP)

(73) Assignee: Sakura Color Products Corporation, Osaka (JP)

( * ) Notice: Subject to any disclaimer, the term of this patent is extended or adjusted under 35 U.S.C. 154(b) by 0 days.

(21) Appl. No.: 09/476,328

(22) Filed: Jan. 3, 2000

(30) Foreign Application Priority Data

Jan. 8, 1999 (JP) ................................................ 11-2708

(51) Int. Cl.$^7$ ................................................ C09D 11/00
(52) U.S. Cl. ................................ 106/31.32; 106/31.58; 106/31.64; 106/31.86
(58) Field of Search ........................... 106/31.32, 31.58, 106/31.64, 31.86

(56) References Cited

U.S. PATENT DOCUMENTS

| | | | | |
|---|---|---|---|---|
| 4,509,982 A | * | 4/1985 | Iijima .................... | 106/31.69 |
| 4,840,833 A | * | 6/1989 | Iijima .................... | 428/207 |
| 5,120,359 A | * | 6/1992 | Uzukawa et al. ......... | 106/31.25 |
| 5,203,913 A | * | 4/1993 | Yamamoto et al. ........ | 106/31.5 |
| 5,621,021 A | * | 4/1997 | Yoshioka et al. ........... | 523/160 |
| 5,854,320 A | * | 12/1998 | Nakamura et al. ............ | 524/48 |
| 5,977,211 A | * | 11/1999 | Koyama ..................... | 523/161 |
| 6,013,122 A | * | 1/2000 | Kitaman et al. ......... | 106/31.03 |
| 6,037,391 A | * | 3/2000 | Iida ........................... | 523/161 |
| 6,040,359 A | * | 3/2000 | Santini et al. .............. | 523/161 |
| 6,048,914 A | * | 4/2000 | Goto et al. .................. | 523/161 |

\* cited by examiner

Primary Examiner—Helene Klemanski
Assistant Examiner—Veronica F. Faison
(74) Attorney, Agent, or Firm—Rader, Fishman & Grauer PLLC

(57) ABSTRACT

An object of this invention is to provide an ink composition with particularly excellent erasability and fixability, the erasability not declining with the lapse of time. This invention provides an erasable ink composition comprising a colorant, a film-forming resin and a release agent.

6 Claims, No Drawings

ERASABLE INK COMPOSITION

FIELD OF THE INVENTION

The present invention relates to a novel erasable ink composition.

BACKGROUND OF THE INVENTION

Erasable ink is characterized in that when letters, drawings or the like are written or made on paper, the lines drawn with the ink can be erased with a rubber eraser. The ink is used in felt-tip pens or the like.

Known as such an erasable ink is an ink composition for paper, the composition being prepared by uniformly dispersing a pigment such as carbon black in a solution of a high molecular weight polyethylene oxide in an aqueous medium, in the presence or absence of a surfactant. This ink composition comprises 1–20% by weight of a pigment and 0.01 to 5% by weight of a high molecular weight polyethylene oxide, so that letters and drawings formed with the ink composition on paper can be erased with a rubber eraser (Japanese Examined Patent Publication No. 39470/1989).

However, since the above ink composition has an extremely high adhesion to the paper surface, it is not always easily erasable with a rubber eraser. The problem of erasability becomes more serious when the ink is used in ballpoint pens with which great writing pressure tends to be applied. On the other hand, if the adhesion of the ink composition is reduced to increase erasability, fixability will inevitably decline. When the ink composition has lower fixability, mere rubbing with a finger may easily erase the drawn lines. Until now, no technology has been established that provides good erasability and high fixability.

The conventional erasable ink compositions have another problem that erasability declines with the lapse of time due to the deterioration of the inks. The lines are relatively easy to erase immediately after drawing but will become difficult to erase with the lapse of time.

A main object of the present invention is to provide an ink composition particularly excellent in erasability and fixability. Another object of the present invention is to provide an ink composition which can draw lines whose erasability does not decline with the lapse of time.

SUMMARY OF THE INVENTION

The present inventors carried out extensive research to solve the prior art problems and found that the above objects can be accomplished with a specific ink composition. The present invention has been accomplished based on this finding.

The present invention provides an erasable ink composition that comprises a colorant, a film-forming resin and a release agent.

DETAILED DESCRIPTION OF THE INVENTION

Any colorant may be used as long as the effects of the present invention are not sacrificed. Colorants used in known aqueous ink compositions or the like can be used. Useful colorants include, for example, inorganic pigments such as titanium oxide, carbon black, ultramarine blue, cobalt blue, chromium oxide, iron oxide red and graphite, and organic pigments such as C.I. pigment black 1, C.I. pigment green 7, C.I. pigment blue 15, C.I. pigment red 112 and C.I. pigment violet 19. In addition, fluorescent pigments, luminescent pigments and the like can be used. Furthermore, the so-called colored resin beads can be used as a colorant in the practice of the present invention. Examples of colored resin beads are resin beads (e.g., of an acrylic resin or a styrenic resin) containing a dye or pigment, resin beads colored with a dye, etc. Further, in the practice of the present invention, toners for copying may also be used. These colorants may be used either singly or in combination of two or more. Among them, the use of colored resin beads is preferred.

There is no specific limitation on the particle size of the colorant in the practice of the present invention. The colorant usually has an average particle size of about 0.3 to 20 $\mu$m, preferably 0.5 to 10 $\mu$m. In other words, according to the present invention, a fine colorant having an average particle size of less than 1 $\mu$m can also be used as an erasable ink. The particle size distribution can be controlled by a known classification technique such as spontaneous sedimentation, centrifugation or filter filtration.

The term "average particle size" used herein means weight average particle diameter, which was determined as follows. The weight cumulative distribution was determined by the liquid phase centrifugal sedimentation method in the light transmission mode (measuring apparatus "CAPA-700", manufactured by Horiba Seisakusho K.K.). The average particle size was expressed by the particle size corresponding to 50% by weight in cumulative distribution. The specific gravity of the colorant particles was calculated using the true specific gravity.

The shape of the colorant is not critical but may be spherical, polyhedral, flaky or fibrous, for instance. In the practice of the present invention, however, a basically spherical form is preferred and, in particular, it is preferred that the shape be as close as possible to the true sphere.

The content of the colorant may be judiciously selected in consideration of the other components used. It is usually about 1 to 40% by weight, preferably 3 to 20% by weight. When the content is more than 40% by weight, the viscosity will be excessively high, so that the ink will flow out with difficulty. When it is less than 1% by weight, sufficient coloration may not be attained in some instances.

Any resin that has film formability may be used as a film-forming resin. Resins known or commercially available can be used. Examples are polyethylene oxide, methyl cellulose, ethyl cellulose, hydroxyethyl cellulose, carboxymethyl cellulose, polyvinyl pyrrolidone, polyvinyl alcohol, sodium polyalginate, sodium polyacrylate, dextrin, gum arabic and the like. These resins may be used either singly or in combination of two or more. Among them, polyethylene oxide or like resins having film formability, stringiness and cohesion are preferred. The molecular weight of the film-forming resin is not limited specifically and may be adequately selected according to the resin used. For example, polyethylene oxide for use as a film-forming resin usually has a molecular weight of about 150,000 to 4,800,000 (preferably 500,000 to 4,000,000).

The content of the film-forming resin may be judiciously selected in consideration of the film-forming resin and release agent used. It is usually about 0.1 to 5% by weight, preferably 0.5 to 2% by weight. When the content is too low, the desired film formability may not be provided. When it is too high, the adhesion of the ink composition will be excessively high and poor erasability may result.

Any release agent may be used as long as it is soluble in water and is solid or semi-solid (more specifically, in a hard to soft wax state) at normal temperatures. Release agents known or commercially available can be used. Examples are polyethylene glycol, soap (fatty acid salt), polyoxyethylene fatty acid ester, polyoxyethylene alkyl ether, polyoxyethylene alkylarylether, polyoxyethylene sorbitan fatty acid ester, polyoxyethylene sorbitol fatty acid ester, sucrose fatty acid ester, water-soluble lanolin, water-soluble wax and the like. These release agents may be used either singly or in combination of two or more. The most preferable among them is polyethylene glycol (particularly the one having a molecular weight of 500 or more, preferably 700 to 2,800, more preferably 950 to 2,100). The release agents having such a molecular weight provide particularly excellent erasability. The molecular weight used herein means a weight average molecular weight, which was determined by gel penetration chromatography (GPC).

The content of the release agent may be judiciously selected in consideration of the film-forming resin and release agent used. It is usually about 3 to 30% by weight, preferably 7 to 20% by weight. When the content is too low, sufficient erasability may not be attained. When it is too high, poor fixability may result. The ratio of the film-forming resin to the release agent may be judiciously selected in consideration of their molecular weights and the other components used. The film-forming resin:release agent ratio (by weight) is usually between about 1:1 and about 1:40, preferably between 1:2 and 1:20.

The erasable ink composition of the present invention may further comprise a water-soluble polymer. Any of the natural, synthetic or semisynthetic polymers that are soluble in water may be used. Polymers used as gelling agents in known gel inks can be used as they are. These polymers may be used either singly or in combination of two or more. Among them, xanthan gum, carboxymethylcellulose, guar gum, pullulan, rhamsan gum, welan gum, succinoglucan and like polysaccharides are preferred. In particular, polysaccharides represented by the following formula are more preferable.

positions with adequate viscosity and dischargeability more effectively. Therefore, a ballpoint pen ink composition comprising rhamsan gum exhibits high ink viscosity in ink tanks, so that the ink composition will not leak from the pen tip and colorant separation will not occur. On the other hand, when a shearing force is applied to the composition as a result of ball spinning on the occasion of writing, the ink viscosity is reduced and good dischargeability is thereby attained.

The content of the water-soluble polymer may be judiciously selected in consideration of the other components used. It is usually about 0.05 to 2% by weight, preferably 0.1 to 0.6% by weight. When the content is more than 2% by weight, the viscosity will become excessively high, worsening the dischargeability of the ink. When it is less than 0.05% by weight, the ink may undergo phase separation.

In the practice of the present invention, various additives used in known aqueous ink compositions may also be incorporated in appropriate amounts, if necessary. Examples of additives are dispersing agents, wetting agents, preservatives, antifungal agents, rust preventing agents, viscosity modifiers, pH adjusting agents and the like.

Dispersing agents are used especially for increasing the dispersibility of colorants. Useful dispersing agents are, for example, anionic surfactants such as sodium naphthalenesulfonate-formaldehyde condensates, higher alcohol sulfate sodium salts and sodium alkylbenzenesulfonates, and nonionic surfactants such as polyethylene glycol alkyl ethers, polyethylene glycol alkylphenyl ethers and polyethylene glycol lauryl ether. Among them, anionic surfactants are preferred and sodium naphthalenesulfonate-formaldehyde condensates are more preferable. Such dispersing agents are usually added in an amount of about 0.01 to 1% by weight, preferably 0.1 to 0.5% by weight.

Wetting agents are used especially for adjusting the drying speed of ink compositions to a desired range. Addition of wetting agents further improves storability and cap-off performance. Useful wetting agents are, for example, dihy-

[Chemical formula 1]

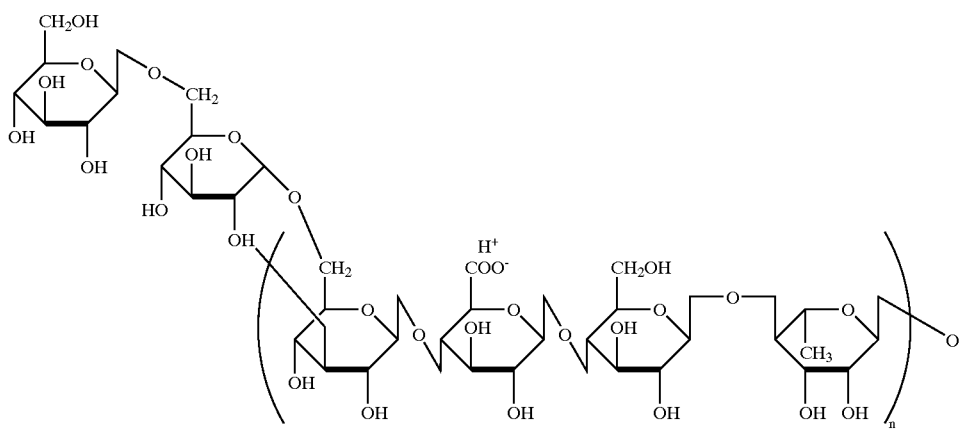

(In the above formula, M represents an alkali metal selected from sodium, potassium and lithium, and n is 1,000 to 3,000.)

The polysaccharides represented by the above formula can provide ink compositions with excellent thixotropic properties, stringiness and dischargeability. As polysaccharides having these characteristics, commercial products, for example "rhamsan gum" (available from Sansho Corp.), can be used. This polysaccharide (rhamsan gum) has particularly excellent thixotropic properties and can provide ink comdric alcohols such as ethylene glycol, diethylene glycol, triethylene glycol, 1,8-propanediol, propylene glycol, 1,3-butylene glycol, 1,4-butanediol, 2,3-butylene glycol, neopentyl glycol, hexylene glycol and thiodiglycol, polyhydric alcohols such as glycerin, trimethylolethane, trimethylolpropane, 3-methylpentane-1,3,5-triol, diglycerin and sorbite, glycol ethers such as ethylene glycol monomethyl ether, ethylene glycol monoethyl ether, ethylene glycol monobutyl ether, ethylene glycol monobutyl ether, diethylene glycol monomethyl ether and diethylene glycol monobutyl ether and, further, pyrrolidone, N-methyl-2-pyrrolidone, dimethylformamide and the like. These wetting agents may be used either singly or in combination of two or more. Among them, ethylene glycol, propylene glycol and glycerin are preferred. Such wetting agents are usually added in an amount of about 1 to 30% by weight, preferably 2 to 25% by weight.

Useful preservatives/antifungal agents are, for example, potassium sorbate, sodium benzoate, pentachlorophenol sodium, sodium dehydroacetate, 1,2-benzisothiazolin-3-one, 2,3,5,6-tetrachloro-4-(methylsulfonyl)pyridine, benzimidazole compounds and the like. These preservatives/antifungal agents may be used either singly or in combination of two or more. Among them, sodium benzoate is preferred. Such preservatives/antifungal agents are usually added in an amount of about 0.2 to 3% by weight, preferably 0.5 to 2% by weight.

In the practice of the present invention, known film-forming resins may also be added within the limits within which the effects of the present invention are not sacrificed. Examples of such resins are synthetic rubbers such as styrene-butadiene rubbers, acrylonitrile-butadiene rubbers and chloroprene rubbers, and natural rubbers such as latices. These resins may be used either singly or in combination of two or more. Among them, styrene-butadiene rubbers and natural rubbers are preferred. The amount of such resin may be judiciously selected in consideration of the film-forming resin and release agent used.

The solvent for the ink composition of the present invention may be the same as used in known aqueous ink compositions. For example, water (or an aqueous solvent) can be used. In this case, the amount of water may be adequately selected according to the desired viscosity, kinds and amounts of the other components used, etc. Water is usually added in an amount of about 60 to 95% by weight, preferably 70 to 80% by weight, in total.

The viscosity of the ink composition of the present invention may be selected according to the intended use of the final products and other factors. Generally, it is recommended that the viscosity be about 50 to 10,000 mPa·s, preferably 300 to 5,000 mPa·s. The viscosity can be adequately adjusted by incorporation of the components in appropriate amounts. The ink viscosity used herein means the value measured using an ELD type viscometer under the conditions of 3° (R14) cone, 0.5 revolution per minute (rpm) and 20° C.

The ink composition of the present invention can be prepared basically in the same manner as in the production of known aqueous ink compositions. For example, the components other than the colorant and the dispersing agent are added to water and then the colorant with an adjusted particle size distribution is gradually added with stirring. The particle size distribution of the colorant may be adjusted by optionally adding a dispersing agent to the colorant such as a pigment or colored resin beads, diluting the mixture with water with stirring and classifying the resulting dispersion by centrifugation.

The ink composition of the present invention can be used in substantially all sorts of writing tools and printing. It can be used, for example, in marker pens, felt-tip pens, ballpoint pens and like writing tools. In particular, owing to its excellent erasability, the ink composition of the present invention is best suited for use in ballpoint pens (aqueous ink-filled ballpoint pens).

The aqueous ink-filled ballpoint pen may be composed of known ballpoint pen parts except that the ink is an erasable ink composition of the present invention. For example, an ink cartridge of a known material and a known size may be used as it is. As regards the materials for the ink cartridge, polyethylene, polypropylene or like synthetic resin pipes or metal pipes may be used. As for the ballpoint pen tip, the material and structure used in known aqueous ink-filled ballpoint pens may be used.

The ballpoint pen can be assembled by conventional methods for assembling ballpoint pens. For example, an ink cartridge made of polypropylene with a German silver ballpoint pen tip (ball material: cemented carbide, ceramic, etc.) attached at one end is charged with the erasable ink composition of the present invention to give a ballpoint pen refill. Then, the refill is attached to the main body, a tail stopper is attached, and the air within the ballpoint pen refill cartridge is removed using a centrifuge, to give an aqueous ink-filled ballpoint pen.

EFFECTS OF THE INVENTION

The erasable ink composition of the present invention comprises a film-forming resin and a release agent and therefore exhibits high erasability and excellent fixability.

Lines drawn with the ink composition of the present invention exhibit excellent fixability so that mere rubbing with a finger will not blur or erase the lines. On the other hand, owing to its excellent erasability, even when writing is done with a great writing force, the lines can be erased with ease. In this respect, the ink composition of the present invention is best suited for use as an ink composition for ballpoint pens with which writing pressure tends to be relatively high.

Furthermore, the erasable ink composition of the present invention exhibits erasability that is highly stable with the lapse of time. According to the ink composition of the present invention, the drawn lines will not become difficult to erase with the lapse of time.

In addition, when the ink composition of the present invention is gelled with a water-soluble polymer, further improved effects are achieved in stability with time, storability, ink dischargeability and cap-off performance. Unlike the conventional erasable ink compositions, the ink composition of the present invention never causes separation or sedimentation nor causes clogging within the pen. Furthermore, it is excellent in ink dischargeability, so that drawn lines will not show any interruption. Moreover, the ink composition of the present invention is excellent in cap-off performance, so that writing can be perfectly done even after 24 hours of standing in an uncapped state, for instance. By contrast, the conventional erasable ink compositions cause film formation at the pen tip, making it impossible to use the pen any longer.

The erasable ink composition of the present invention having such characteristics is useful as an ink composition for felt-tip pens, marker pens or the like and for use in printing. In particular, the ink composition of the present invention is best suited as an ink composition for ballpoint pens.

EXAMPLES

Examples and comparative examples are given below to further clarify the characteristics of the present invention.

Example 1

A colorant (blue resin beads (product of Soken Chemical, resin: acrylic resin, dye: Sudan blue B) was placed in a Disper dispersion apparatus and diluted with water to give a dispersion, followed by stirring for 3 hours. The resulting dispersion was classified by centrifugation to adjust the particle size to a range of 1 to 5 μm. Dissolved in water and mixed were 2 parts by weight of polyethylene oxide (molecular weight: 600,000 to 1,000,000), 9 parts by weight of polyethylene glycol (molecular weight: 950 to 1,050), 0.3 parts by weight of rhamsan gum as a water-soluble polymer, 3.5 parts by weight of ethylene glycol as a wetting agent, 0.5 part by weight of sodium naphthalenesulfonate-formaldehyde condensate as a dispersing agent and 1 part by weight of sodium benzoate as a preservative. While this solution was being stirred, 15 parts by weight of the classified colorant was gradually added. After completion of addition, stirring was continued for 3 hours to give an ink composition. The water content of the ink composition was 68.7 parts by weight.

Example 2

An ink composition was prepared in the same manner as in Example 1 except that the colorant, polyethylene oxide, polyethylene glycol, water-soluble polymer, wetting agent, preservative and water were used in the amounts described below. The colorant to be used had a particle size of 0.5 to 1.5 μm.

|  | Weight parts |
| --- | --- |
| Colorant: titanium oxide | 10 |
| Polyethylene oxide: molecular weight 3,300,000 to 3,800,000 | 0.7 |
| Polyethylene glycol: molecular weight 1,900 to 2,100 | 10 |
| Water-soluble polymer: xanthan gum | 0.4 |
| Wetting agent: glycerin | 3 |
| Dispersing agent: sodium naphthalenesulfonate-formaldehyde condensate | 0.5 |
| Preservative: sodium benzoate | 1 |
| Water | 74.4 |

Example 3

An ink composition was prepared in the same manner as in Example 1 except that the colorant, polyethylene oxide, polyethylene glycol, water-soluble polymer, wetting agent, preservative and water were used in the amounts described below. The colorant to be used had a particle size of 1 to 3 μm.

|  | Weight parts |
| --- | --- |
| Colorant: black toner | 7 |
| Polyethylene oxide: molecular weight 600,000 to 1,100,000 | 2.8 |
| Polyethylene glycol: molecular weight 1,300 to 1,600 | 9.6 |
| Water-soluble polymer: rhamsan gum | 0.1 |
| Wetting agent: diethylene glycol | 4.5 |
| Dispersing agent: polyethylene glycol alkylphenyl ether | 0.1 |
| Preservative: sodium benzoate | 1 |
| Water | 74.9 |

Example 4

An ink composition was prepared in the same manner as in Example 1 except that the colorant, polyethylene oxide, polyethylene glycol, water-soluble polymer, wetting agent, preservative and water were used in the amounts described below. The colorant to be used had a particle size of 0.5 to 4.5 μm.

|  | Weight parts |
| --- | --- |
| Ultramarine blue (product of Holiday Pigments, grade: Blue 02) | 10 |
| Polyethylene oxide: molecular weight 600,000 to 1,100,000 | 2.5 |
| Polyethylene glycol: molecular weight 950 to 1,050 | 11 |
| Water-soluble polymer: xanthan gum | 0.1 |
| Wetting agent: glycerin | 5 |
| Dispersing agent: naphthalenesulfonate-formaldehyde condensate | 0.5 |
| Preservative: sodium benzoate | 1 |
| Water | 69.9 |

Comparative Example 1

An ink composition was prepared in the same manner as in Example 1 except that polyethylene oxide was not used and 70.7 parts by weight of water was used.

Comparative Example 2

An ink composition was prepared in the same manner as in Example 1 except that polyethylene glycol was not used and 77.7 parts by weight of water was used.

Comparative Example 3

An ink composition was prepared in the same manner as in Example 1 except that the components were used in the amounts described below. Black toner was the same as used in Example 3.

|  | Weight parts |
| --- | --- |
| Colorant: black toner | 7 |
| Polyethylene oxide: molecular weight 600,000 to 1,100,000 | 2.8 |
| Polyethylene glycol: molecular weight 190 to 210 | 9.6 |
| Wetting agent: diethylene glycol | 4.5 |
| Dispersing agent: polyethylene glycol alkylphenyl ether | 0.1 |
| Preservative: Sodium benzoate | 1 |
| Water | 75 |

Comparative Example 4

An ink composition was prepared in the same manner as in Example 1 except that the components were used in the amounts described below. Black toner was the same as used in Example 3.

|  | Weight parts |
| --- | --- |
| Colorant: Black toner | 10 |
| Styrene-butadiene rubber ("JSR0561", product of JSR) | 25 |
| Wetting agent: diethylene glycol | 4.5 |
| Dispersing agent: polyethylene glycol alkylphenyl ether | 0.2 |

-continued

| | Weight parts |
|---|---|
| Preservative: sodium benzoate | 1 |
| Water | 58.8 |

Test Example 1

The ink compositions prepared in Examples 1–4 and Comparative Examples 1–4 were used to produce aqueous ink-filled ballpoint pens. The ballpoint pens were tested for their erasability, fixability, ink dischargeability, storability and cap-off performance. Table 1 shows the results. The performance tests were carried out in the following manner.
(1) Erasability (Immediately After Writing and 5 Days After Writing)

The erasability was expressed in terms of color density Y as determined using a colorimeter ("CR-241", product of Minolta). The greater the Y value is, the higher the erasability is. The lines drawn on quality paper were rubbed with a rubber eraser with a load of 500 g/cm$^2$ to and fro three times immediately after drawing or 5 days after drawing. The color density of the rubbed portion was determined. With the ink composition of Example 2, lines were drawn on black quality paper (Y value=14.2) and tested in the same manner.
(2) Fixability Writing was done on quality paper using the aqueous ink-filled ballpoint pens. After drying, the drawn lines were rubbed with a finger. The extent of blurring of the drawn lines was compared with that of lines written with various grades of pencils, and the corresponding grade of pencil was reported. The load for writing with pencils was 500 g. The evaluation criteria used are as follows:

A: Blurring less than that observed in the case of a 2H or harder pencil;

B: About the same as 2H to 2B;

C: Blurring more pronounced than that observed in the case of a 2B or softer pencil.
(3) Ink Dischargeability Writing was done on quality paper using the aqueous ink-filled ballpoint pens. The amount of the ink discharged (mg/100 m) was determined.
(4) Storability The aqueous ink-filled ballpoint pens were stored at 50° C. for a month and then tested for the occurrence or nonoccurrence of phase separation of ink and for ink dischargeability (in terms of clogging, line interruption and density). The evaluation criteria used are as follows:

A: No phase separation of ink, good ink dischargeability;

B: Slight phase separation of ink, ink dischargeability questionable;

C: Phase separation severe, practical use of the pen quite impossible.
(5) Cap-off Performance The aqueous ink-filled ballpoint pens were uncapped and allowed to stand in that state for 1 hour and then checked for writing performance. The letter "A" was written in each square (1 cm×1 cm). The evaluation criteria are as follows:

A: The pen wrote perfectly immediately;

B: The pen could write effectively within 3 letters;

C: Writing was impossible even after 20 letters.

TABLE 1

| | Erasability | | | | | |
|---|---|---|---|---|---|---|
| | Immediately after writing | 5 days after writing | Ink dischargeability | Fixability | Storability | Cap-off performance |
| Ex. 1 | 72.1 | 72.1 | 120 mg | A | A | A |
| Ex. 2 | 14.5 | 14.7 | 130 mg | A | A | A |
| Ex. 3 | 71.5 | 71.6 | 155 mg | A | A | A |
| Ex. 4 | 70.3 | 70.1 | 150 mg | A | A | A |
| Comp. Ex. 1 | 52.4 | 50.5 | 140 mg | B | A | A |
| Comp. Ex. 2 | 43.9 | 35.3 | 30 mg> | A | B | B |
| Comp. Ex. 3 | 70.5 | 39.5 | 156 mg | A | C | A |
| Comp. Ex. 4 | 59.5 | 25.3 | 125 mg | A | C | C |

As is clear from Table 1, the ink compositions of the present invention exhibit particularly high erasability and excellent fixability. The ink composition of Example 2 also exhibits high erasability. It is clear from the results that its color density was similar to the Y value of the original black quality paper.

Furthermore, the ink compositions of the present invention exhibit high stability. It is clear from the results that the lines five days after drawing were just as erasable as the lines immediately after drawing.

What is claimed is:

1. An erasable ink composition comprising a colorant, a film-forming resin and a release agent, wherein the film-forming resin is a polyethylene oxide and the release agent is a polyethylene glycol having a molecular weight of 500 or more.

2. An erasable ink composition according to claim 1, which comprises 1 to 40% by weight of the colorant, 0.1 to 5% by weight of the film-forming resin and 3 to 30% by weight of the release agent.

3. An erasable ink composition according to claim 1 wherein the polyethylene glycol release agent has a molecular weight of 950–2,100.

4. An erasable ink composition according to claim 1 wherein the colorant has an average particle size of 0.5 to 10 μm.

5. An erasable ink composition according to claim 1 which further comprises a water-soluble polymer.

6. An erasable ink composition according to claim 5 wherein the water-soluble polymer is a polysaccharide.

* * * * *